United States Patent [19]
Olsen

[11] 3,775,550
[45] Nov. 27, 1973

[54] ELECTRIC HIGH-VOLTAGE POLYPHASE POWER TRANSMISSION SYSTEM

[75] Inventor: Willi Olsen, Berlin, Germany

[73] Assignee: Siemens Aktiengesellschaft, München, Germany

[22] Filed: Jan. 9, 1973

[21] Appl. No.: 322,210

[30] Foreign Application Priority Data
Jan. 14, 1972 Germany.................. P 22 02 403.9

[52] U.S. Cl. .............. 174/27, 174/15 C, 174/16 B, 174/99 B, 174/149 B, 307/147
[51] Int. Cl. ............................................ H01b 9/06
[58] Field of Search ................ 174/27, 15 C, 16 B, 174/99 B, 99 R, 70 B, 71 R, 71 B, 72 B, 47, 68 B, 26 G, 149 B; 307/147

[56] References Cited
UNITED STATES PATENTS

| | | | |
|---|---|---|---|
| 2,167,378 | 7/1939 | Shoemaker et al. | 174/16 B |
| 3,170,030 | 2/1965 | Beck et al. | 174/68 B X |
| 3,293,407 | 12/1966 | Masa Ando | 174/47 X |
| 2,776,385 | 1/1957 | Modrey | 174/47 |
| 2,740,095 | 3/1956 | Somes | 174/47 X |

FOREIGN PATENTS OR APPLICATIONS
338,765  7/1904  France.................. 174/27

Primary Examiner—Bernard A. Gilheany
Assistant Examiner—A. T. Grimley
Attorney—Hugh A. Chapin et al.

[57] ABSTRACT

An electric multi-line high-voltage polyphase power transmission system has two tubular electrically conductive and electrically grounded enclosures, each containing the two or more conductors of two polyphase circuits with the conductors spaced from the enclosure's inside, the two enclosures being formed not by separated tubes but instead by a single large tubular enclosure having a longitudinally extending wall forming it into those two enclosures, both of the latter being filled with compressed gas insulation. Because of the large overall size of this large enclosure, with the wall vertically arranged, the gas may be removed from one side of the wall and replaced with air so that personnel may enter for servicing reasons.

10 Claims, 4 Drawing Figures

ELECTRIC HIGH-VOLTAGE POLYPHASE POWER TRANSMISSION SYSTEM

BACKGROUND OF THE INVENTION

When two or more electric high-voltage compressed-gas-insulated, polyphase, power transmission lines are required, each line has been run separately from the other. Each line must comprise a tubular electrically conductive enclosure, such as a steel tube, containing the necessary plurality of electric power conductors spaced from the enclosure's inside and from each other by electrically insulating spacers, each enclosure containing compressed gas insulaton such as compressed sulfur-hexafluoride. Usually these are underground installations.

In case of suspected or real trouble, inspection and/or servicing of the conductor and its insulating spacers on the inside of the tubular enclosure is troublesome. For example, assuming that each line requires three conductors of a three-phase circuit carrying 3,000 amperes at 380 kilovolts, with the conductors appropriately positioned considering the electrostatic fields involved, by electrically insulating spacers within a tubular metallic electrically conductive enclosure, the size of the latter for economic reasons is made no greater than required electrically, and this does not involve a large enough enclosure interior to permit traverse by service personnel.

When two, and possibly more, of such polyphase transmission lines are required, the excavation work usually required is relatively expensive, which is another disadvantage. The reasons two lines may be required are to furnish adequate power, or so that one is available if the other is put out of service, and even when one is adequate to supply the then present power demand, a greater power requirement may be anticipated for the future, in which case both can be put in service.

SUMMARY OF THE INVENTION

One of the objects of the present invention is to reduce the overall expense of such a multi-line polyphase electric power system and to provide for direct inspection and servicing of the lines.

According to the present invention, this object is attained by forming the necessary two enclosures, or possibly more, by a single large tubular metal enclosure having, in the case of two polyphase circuits, a gas-tight dividing metal wall extending lengthwise of this large enclosure. Preferably the enclosure is made substantially circular in cross section because of its mechanical resistance to crushing when an underground installation. With the dividing wall symmetrically positioned in a vertical plane and with the spaces on each side of the wall large enough in cross section to meet the electrical requirements, adequate size is provided for a man to walk inside on one or the other side of the dividing wall. To do this, of course, the electric power is shut off and the conductors are grounded for safety, and the compressed gas insulation is removed and replaced with life-sustaining air. Enough space is inherently present for rails to be laid in the enclosure on either side of the wall to form track-ways which may be provided with a carriage or trolley to carry testing equipment and tools or the man himself.

With the large tubular enclosure at atmospheric pressure on one side to permit servicing to proceed on that side, and with the compressed gas insulation under its full pressure on the other side of the wall where that line remains in operation, the wall is, of course, stressed by the gas pressure in diaphragm fashion. To resist this, the wall may be stiffened in a manner familiar to structural engineers.

Preferably the dividing wall is made hollow, and when one side is at atmospheric pressure, it may be filled with compressed gas, which may be the compressed gas insulation, at a pressure of approximately half that of the sum of the pressure on both sides of the wall. This has the effect of reducing the compressed gas insulation pressure on the wall.

When a hollow dividing wall is used, it has the advantage that by the use of appropriate internal stiffening members, and when vertically arranged, it acts throughout the length of the long enclosure as a structural column of substantial strength resisting the crushing weight of ground above the enclosure in the case of an underground installation. Furthermore, being hollow, the wall may act as a conduit for supplying the compressed-gas insulation to the space on either side of the wall and/or for maintaining the pressure at the desired value. Electrical conduits, for example, may be run through the hollow wall or conduits may be run through it for transmitting a cooling medium if cooling of the enclosure is required.

Typically in the case of 3 × 380 kilovolt lines, for example, the large tubular enclosure may have a diameter of 2.20 meters making it possible to walk through it. The enclosure would also oridinarily be transversely divided into lengthwise sections, such as by having transverse gas-tight dividing walls or bulkheads spaced from each other at, for example, 200 meter intervals. Each section provided by such bulkheads can be provided with manholes leading to the surface and providing access to each section, using, or course, two manholes to the spaces on opposite sides of the longitudinally extending wall dividing the two transmission lines.

The longitudinally extending wall may be made either solid or partly solid, but as indicated, a hollow wall has advantages. Such a hollow wall may be formed by two flat plates structurally connected together and braced against bending stresses appropriately, if necessary. When in operation, the compressed gas insulation is typically maintained at a pressure of 3 kg/cm$^2$, the effect of which may be relieved by the partial pressure of gas within the hollow wall as previously indicated. Alternatively, or in conjunction with the use of the internal gas pressure, the hollow wall may be made with convex sides with the convexity facing outwardly and into the two enclosures formed on opposite sides of the wall within the large enclosure. When both lines are in operation with the appropriate pressure on the gas insulation in each, the hollow wall may be filled with gas at this same pressure so that the wall's sides are not stressed at all by the gas pressures, they being then equal and opposite on both sides of each side of the hollow wall.

BRIEF DESCRIPTION OF THE DRAWINGS

The accompanying drawings schematically illustrate preferred embodiments of the present invention, in which.

DESCRIPTION OF THE PREFERRED EMBODIMENTS

Figure 2:
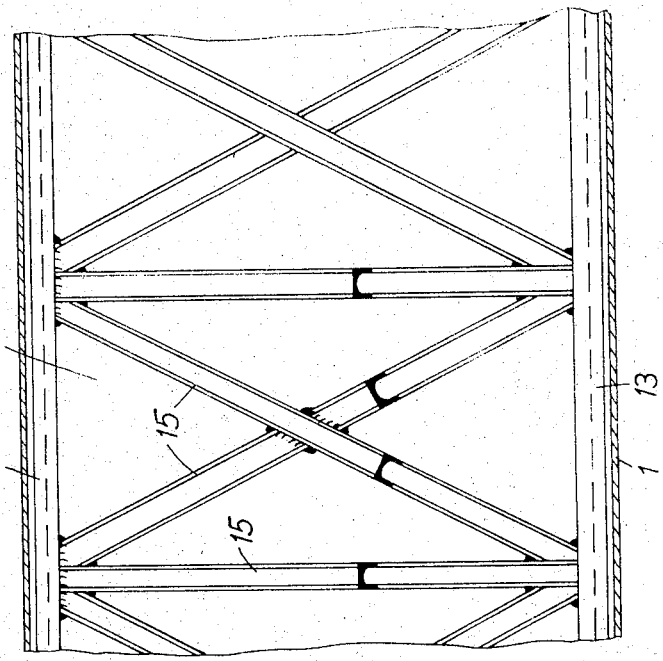
FIG. 2 is a longitudinal cross section taken on the line 2—2 in FIG. 1.
Figure 1:
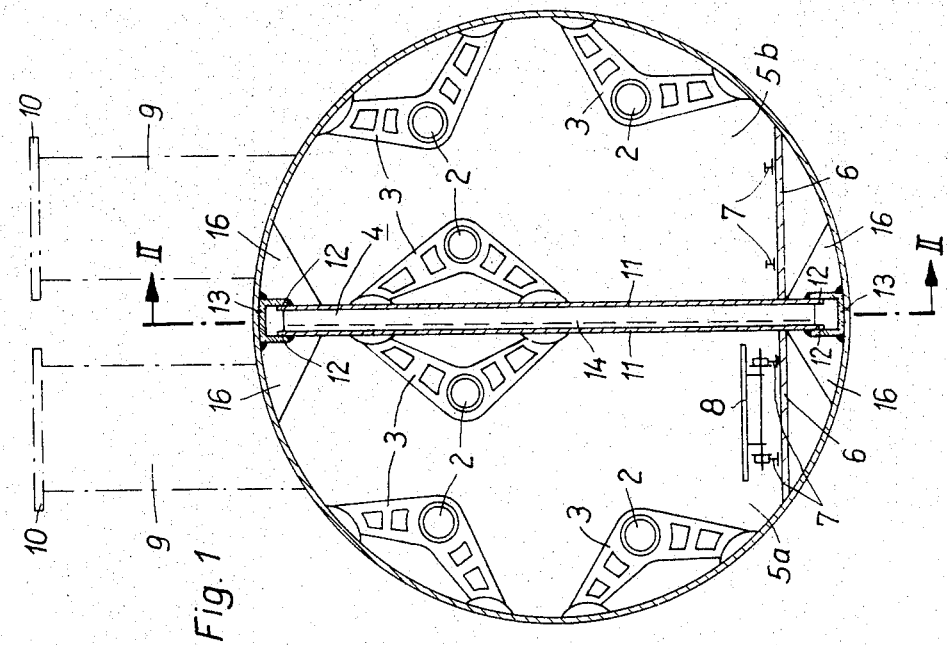
FIG. 1 shows a cross section of two multi-phase compressed-gas-insulated high-voltage lines.

Referring first to FIGS. 1 and 2, the large tubular enclosure 1, previously described, is made of electrically conductive material, usually structural steel. The electric conductors 2 of two multi-phase lines run longitudinally within the large tubular enclosure are mounted by electrically insulating spacers 3, in, of course, groups of conductors respectively located on opposite sides of the vertical wall 4 which divides the large tubular enclosure 1 into two transversely smaller enclosure spaces 5a and 5b. The wall 4 separates these spaces in a gas-tight manner. The wall 4 is vertically arranged symmetrically within the large enclosure 1.

In this instance each of the two multi-phase transmission lines comprise a three-phase line of 3 × 380 kv. and therefore the large enclosure has a diameter of about 2.20 meters. This size is determined by electrical considerations or, in other words, by the distances or space required between the conductors 2 relative to each other and relative to the inside of the electrically conductive enclosure 1 which is, of course, electrically grounded. Assuming an underground installation, as would usually be the case, the vertical wall 4 stiffens the large tubular enclosure 1 against the external forces acting on it, such as the pressure of a loaded road bed which might run above the enclosure. The bottom of the enclosure is provided with floors 6 on which rails 7 are laid to provide track-ways on which a carriage 8 having appropriate flanged wheels may run lengthwise with respect to the two electric power transmission lines.

Each line enclosure or conduit 5a and 5b is provided top-side with an access shaft 9 providing for service manholes, the top of these shafts being closed gas-tightly by cover plates 10. This provides operating personnel with access to the two transmission lines.

In FIGS. 1 and 2 the wall 4 serves to mount two of the insulating spacers 3, one for each of the two transmission lines, in each instance the other spacers being fixed to the inside of the enclosure 1 and in each instance the three conductors being interspaced relative to each other and the inside of the enclosure 1 as required to prevent unduly concentrated electrostatic fields such as even under normal operating conditions might cause electrical arcing.

This wall 4 of FIGS. 1 and 2 is hollow and is made by two interspaced, vertical, flat plates 11 made of sheet metal, such as steel, and joined to each other in a gas-tight manner. At their tops and bottoms these plates are welded in the flanges of channel bars 13 fixed to the inside of the enclosure 1 at top and bottom. At their longitudinal ends the plates 11 are connected to the two transverse bulkheads (not shown) previously mentioned, a gas-tight space 14 being formed between the two plates 11. This space 14 may be used to receive gas as previously described.

The plates 11 may be stiffened by braces 15, formed by channels, to reduce their deflection tendency. These braces 15 may be welded together with the channels 13 on both sides of the wall 4, and also to the plates 11. The support the wall 4 gives to the enclosure 1 in a vertical direction may be enhanced by welding webs 16 between the wall's top and bottom and the inside of the enclosure 1, enhancing the structural rigidity of the entire assembly.

Assuming both transmission lines are in operation, but that one requires inspection or servicing, such as in the space 5b, the compressed gas insulation in the latter is removed and replaced by air at atmospheric pressure. To reduce the deflection of the plates 11 resulting from the gas in the active transmission lines being under its full operating pressure, such as 3 kg/cm², gas pressure may be inserted within the hollow wall 4 at a pressure of about one half the magnitude of the sum of the pressures in the two spaces 5a and 5b, keeping in mind that the space 5b is at atmospheric pressure. In this way each of the wall's plates is stressed with only half the pressure of the compressed gas insulation so that the deflection stresses are accordingly reduced. As previously mentioned, the interior of the wall can be provided with ducts for a cooling medium.

Figure 4:
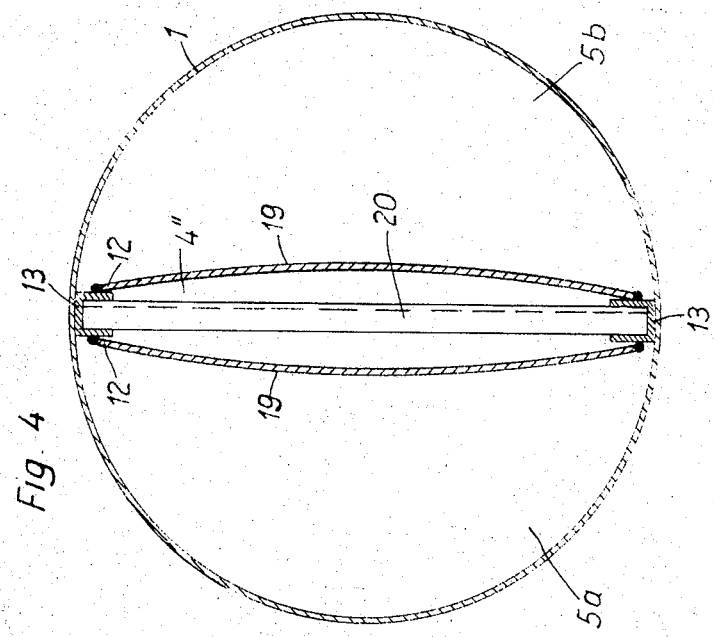
FIG. 4 is also like FIG. 1 but shows a still further modification.
Figure 3:
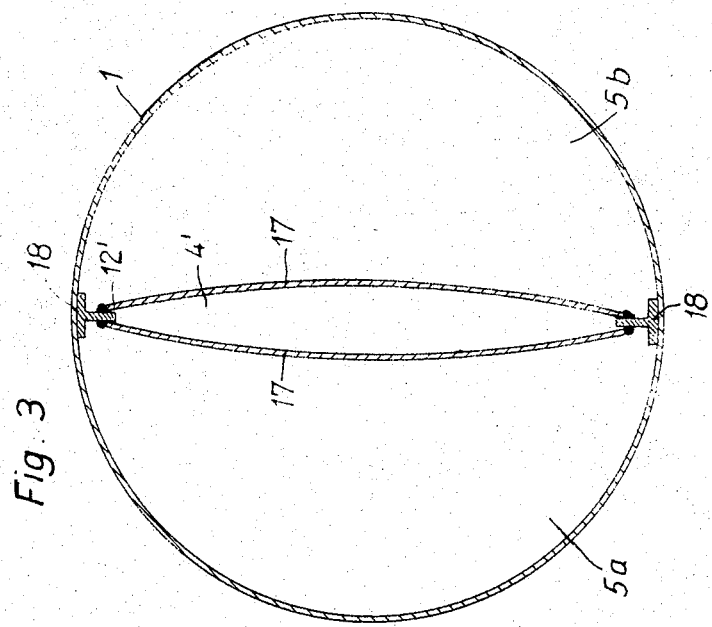
FIG. 3 is similar to FIG. 1 but shows a modification.

In FIGS. 3 and 4 the construction of the wall 4 is shown in modified form, the electrical elements being eliminated in the interest of simplicity.

In FIG. 3 the wall 4' is made from sheet metal having sides 17 which are convex outwardly from the wall's interior and facing towards the spaces 5a and 5b. The hollow space enclosed can be used as previously described. The convex shapes provide enhanced resistance to gas pressure. The edges 12' of the plates are connected by T-bars 18 welded to the inside of the enclosure 1.

In FIG. 4 the convex plates 19 are spaced more widely apart than it is shown at 17 in FIG. 3, and edges 12 are welded to the outsides of the flanges of the channel bars 13 shown in FIG. 1. For vertical stiffening against external forces, channel bars 20 may extend vertically and be welded to the insides of the channel bars 13 as shown.

In all these embodiments it is advantageous to provide a common gas supply point for each line section which supplies the spaces 5a and 5b as well as the space within the hollow wall 4. Suitable valve and pressure monitors would ordinarily be incorporated. These details are not shown.

As previously indicated, the present invention provides for complete access by workmen to either of the lines. Furthermore, the large single enclosure requires less space whan would the conventional use of two tubular enclosures, one for each of the multi-phase lines here accommodated by the single large enclosure. Therefore, in underground installations the earth-moving work is reduced, this being of particular advantage in uran installations.

If three three-phase lines are required, the dividing wall may be a star-shaped cross section, for example, with the diameter of the overall enclosure being correspondingly even larger.

What is claimed is:

1. An electric high-voltage polyphase power transmission system including two tubular electrically conductive enclosures each containing a plurality of conductors spaced from the enclosure's inside by electrically insulating spacers and each being adapted to contain compressed gas insulation; wherein the improvement comprises said enclosures being formed by a single large tubular enclosure having a gas-tight dividing wall extending lengthwise thereof.

2. The system of claim 1 in which said large tubular enclosure is substantially circular in cross section and said wall is symmetrically positioned with respect thereto.

3. The system of claim 1 in which said wall is hollow and forms at least one lengthwise extending conduit.

4. The system of claim 1 in which said large enclosure has means for introducing and removing said electrical insulating gas on at least one side of said wall and the latter is hollow and contains a gas at a pressure at least approximately one half that of the sum of the gas pressures in the two enclosures.

5. The system of claim 2 in which said conductors form two polyphase circuits with the conductors of one circuit on one side of said wall and the conductors of the other circuit on the other side of said wall, in each instance at least one of said conductors being mounted through said spacers by said wall and the conductors of each circuit being symmetrically arranged with respect to those of the other.

6. The system of claim 5 in which said large enclosure has means for introducing and removing said electrical insulating gas on at least one side of said wall and the latter is hollow and contains a gas at a pressure at least approximately one half that of the sum of the gas pressures in the two enclosures.

7. The system of claim 2 in which said wall is vertically oriented and said large enclosure has a diameter large enough to permit a person to move therethrough for inspection and/or maintenance work.

8. The system of claim 7 in which said large enclosure on at least one side of said wall contains a track-way and has a carriage running thereon lengthwise of the large enclosure.

9. The enclosure of claim 3 in which said wall has flat sides and means for stiffening these sides.

10. The enclosure of claim 3 in which said wall has transversely convex sides facing outwardly from the wall's inside.

* * * * *